United States Patent [19]
Olds et al.

[11] Patent Number: 5,930,679
[45] Date of Patent: *Jul. 27, 1999

[54] SATELLITE-BASED RING ALERT APPARATUS AND METHOD OF USE

[75] Inventors: Keith Andrew Olds; Gregory Barton Vatt, both of Mesa, Ariz.; Christopher Neil Kurby, Elmhurst, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/317,082

[22] Filed: Oct. 3, 1994

[51] Int. Cl.⁶ ..................................... H04B 7/185
[52] U.S. Cl. .................. 455/12.1; 455/434; 455/427; 455/455
[58] Field of Search .................. 455/12.1, 13.1, 455/33.1, 34.1, 38.3, 54.1, 67.1, 67.5, 68, 79, 343, 427, 429, 517, 31.2, 31.3, 434, 450, 509, 455, 515–516, 432, 422, 436; 379/57

[56] References Cited

U.S. PATENT DOCUMENTS

| | | |
|---|---|---|
| 5,008,952 | 4/1991 | Davis et al. .......................... 455/12.1 |
| 5,111,535 | 5/1992 | Tokunaga . |
| 5,121,503 | 6/1992 | Davis ................................. 455/12.1 |
| 5,153,902 | 10/1992 | Buhl et al. ............................ 379/57 |
| 5,278,831 | 1/1994 | Mabey et al. ........................ 455/343 |
| 5,343,512 | 8/1994 | Wang et al. ........................ 455/12.1 |
| 5,382,949 | 1/1995 | Mock et al. ........................ 455/343 |
| 5,394,560 | 2/1995 | Kane .................................. 455/12.1 |
| 5,408,684 | 4/1995 | Yunoki et al. ....................... 455/434 |
| 5,423,056 | 6/1995 | Lindquist et al. .................. 455/12.1 |
| 5,448,623 | 9/1995 | Wiedeman et al. ................. 455/12.1 |
| 5,539,921 | 7/1996 | Taylor ................................. 455/13.3 |

*Primary Examiner*—Doris H. To
*Attorney, Agent, or Firm*—Kevin K. Johanson; Sherry J. Whitney; Frank J. Bogacz

[57] ABSTRACT

A satellite communication system provides users with global cellular coverage. To facilitate delivery of calls to users having subscriber units, a fixed channel is defined wherein subscriber units are notified of incoming calls. Subscriber units monitor this ring alert channel and examine subscriber unit IDs transmitted in a ring alert message contained therein. When a subscriber unit determines from the subscriber unit ID that a call is being directed to it, it calls into a network to receive a call. Subscriber units also monitor this fixed channel to receive a control channel directory identifying the location of a subscriber unit's broadcast (control) channels.

6 Claims, 5 Drawing Sheets

SATELLITE-BASED RING ALERT APPARATUS AND METHOD OF USE

RELATED INVENTIONS

The present invention is related to the following inventions which are assigned to the same assignee as the present invention:

Satellite-Based Cellular Messaging System and Method of Operation Thereof, Ser. No. 08/172,966;

Satellite-Based Messaging System Transmitting During Guard Band of Satellite-Based Telephone System and Method of Operation Thereof, Ser. No. 08/317,090;

TDMA Satellite-Based Messaging System and Method of Operation Thereof, Ser. No. 08/317,092;

Message Unit For Use With Multi-Beam Satellite-Based Messaging System and Method of Operation Thereof, Ser. No. 08/317,084;

Message Unit Having Channel Assignment Table For Use With Multi-Channel Satellite-Based Messaging System and Method of Operation Thereof, Ser. No. 08/317,091;

all filed concurrently herewith and assigned to the assignee of the present invention.

TECHNICAL FIELD

This invention relates generally to satellite cellular communications systems and, in particular, a system and method for alerting subscriber units of incoming calls, providing location information, and directing subscriber units to control channels.

BACKGROUND OF THE INVENTION

A cellular communication system projects a number of cells onto the earth. In a terrestrial cellular system, these cells radiate about or from a cell site. Calls placed to subscriber units must be routed through a gateway to a cell site projecting a beam wherein the called subscriber unit resides.

Terrestrial cellular communication systems notify subscriber units of an incoming call by transmitting (paging) a subscriber unit identification number using one or more frequencies within the cell. These paging frequencies are reused in non-adjacent cells.

Subscriber units in terrestrial cellular systems, in contrast to subscriber units in satellite cellular systems, travel at negligible speeds in relation to a cell site. Therefore, Doppler frequencies in terrestrial systems do not significantly spread a paging frequency; however, in a satellite cellular communication system where satellites (cell sites) orbit at speeds of over 20,000 km/hr, Doppler frequency spreading of over 60 kHz to 80 kHz is typical.

Satellite cellular systems implementing multiple frequency reuse of paging frequencies require several broadband (Doppler compensating) paging frequencies consuming significant spectrum.

Additionally, subscriber units in a satellite cellular communication system require control channels (broadcast channels) to provide information pertinent to call termination such as available communication channels. Prior art systems requiring subscriber units to scan multiple channels before control channels are detected consume significant resources and time.

It should be noted, that in a multi-mode communication system where both duplex communication and simplex paging services reside, such as in the case of the present invention, simplex paging retains the paging designation while notification of an incoming call assumes the designation of ring alert.

Thus what is needed is a single ring alert channel to conserve spectrum.

Additionally, what is needed is an easily acquirable and trackable ring alert channel for subscriber units.

Furthermore, what is needed is an efficient method of directing subscriber units to applicable control channels assigned to their present cell.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
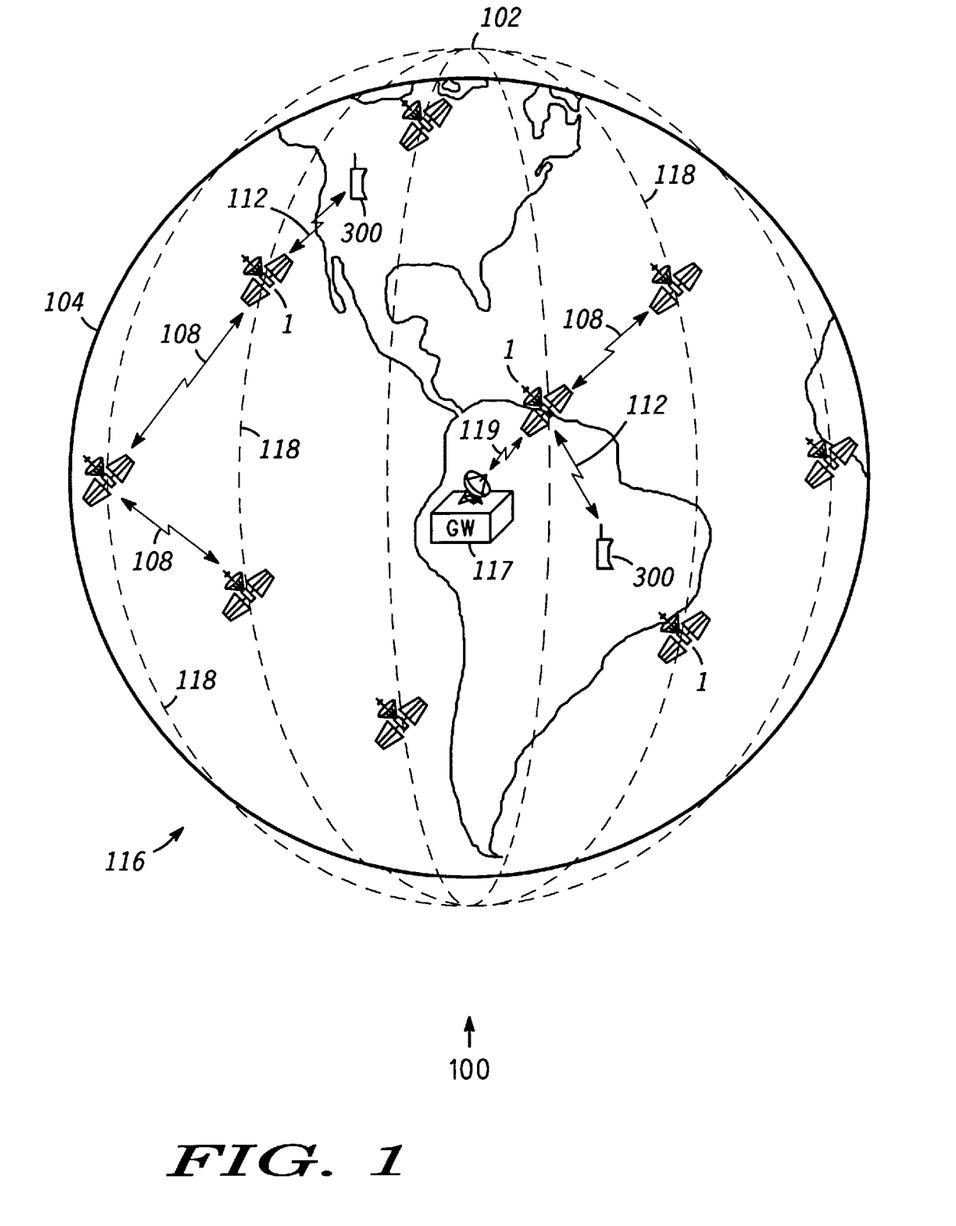
FIG. 1 shows a diagram of an environment which supports a satellite cellular communications system within which the present invention may be practiced.

FIG. 1 shows a diagram of an environment which supports a satellite cellular communications system 116 within which the present invention may be practiced. A constellation 102 consisting of several satellites 1 is placed in a relatively low orbit around the earth.

System 116 includes one or more gateways (GW) 117. Gateways 117 reside on the surface of the earth and are in communication with nearby satellite(s) 1 through gateway link 119. Satellites 1 are also in communication with one another through cross-links 108. In order to synchronize communication and minimize interference, all satellites 1 are locked together in time through intervention of a ground based satellite control function. Thus, all satellites 1 in the constellation essentially run from a common clock.

Through constellation 102 of satellites 1, a gateway 117 may control communications delivered to any size region of the earth. However, the region controlled by each gateway 117 is preferably associated with one or more specific geo-political jurisdictions. Gateway 117 couples to public switched telecommunication networks (PSTN; not shown), from which calls directed toward subscriber units 300 may be received and to which calls placed by subscriber units may be sent.

System 116 also includes any number, potentially in the millions, of subscriber units 300. Subscriber units 300 may be configured as conventional mobile or portable radio communication equipment. Subscriber units 300 are configured to receive communications from satellites 1 and to perform other functions which are discussed below. Subscriber units 300 communicate with nearby satellites 1 through subscriber links 112. Subscriber links 112 consist of among other things broadcast channel(s), traffic uplink and downlink channels, and acquisition channels (see FIG. 3).

Calls are connected between two subscriber units 300, or between a subscriber unit 300 and a PSTN phone number. Generally speaking, each subscriber unit 300 engages in control communications (e.g., broadcast channel monitoring, acquisition, etc.) with a nearby gateway 117 through constellation 102 during call set-up. These control communications take place prior to forming a communication path between a subscriber unit 300 and another unit, which may be another subscriber unit 300 or a PSTN phone number. In particular, a subscriber unit 300 communicates with a gateway 117 via one or more satellites 1. A gateway 117 may be considered the servicing gateway for that particular subscriber unit 300.

Due to low earth orbits, satellites 1 constantly move relative to the earth. If, for example, satellites 1 are placed in orbits which are around 765 km above the earth, then an overhead satellite 1 travels at a speed of around 25,000 km/hr with respect to a point on the surface of the earth. This allows a satellite 1 to be within view of a point on the surface of the earth for a maximum period of around nine minutes. Due to the relatively low orbits of satellites 1, line-of-sight electromagnetic transmissions from any one satellite cover a relatively small area of the earth at any point in time. For example, when satellites 1 occupy orbits at around 765 km above the earth, such transmissions cover areas approximately 6350 km in diameter.

With respect to one another, satellites 1 remain relatively stationary, except for orbits 118 converging and crossing over or intersecting each other in the polar regions and at the counter-rotating seam. Due to this movement, the distances between satellites 1 that reside in common orbits 118 remain substantially constant. However, the distances between satellites 1 that reside in adjacent orbits, also called cross-plane orbits, 118 vary with the latitudes of satellites 1. The greatest distance between these cross-plane satellites 1 exists at the equator. This distance decreases as cross-plane satellites 1 approach the polar regions and increases as cross-plane satellites 1 approach the equator.

Figure 2:
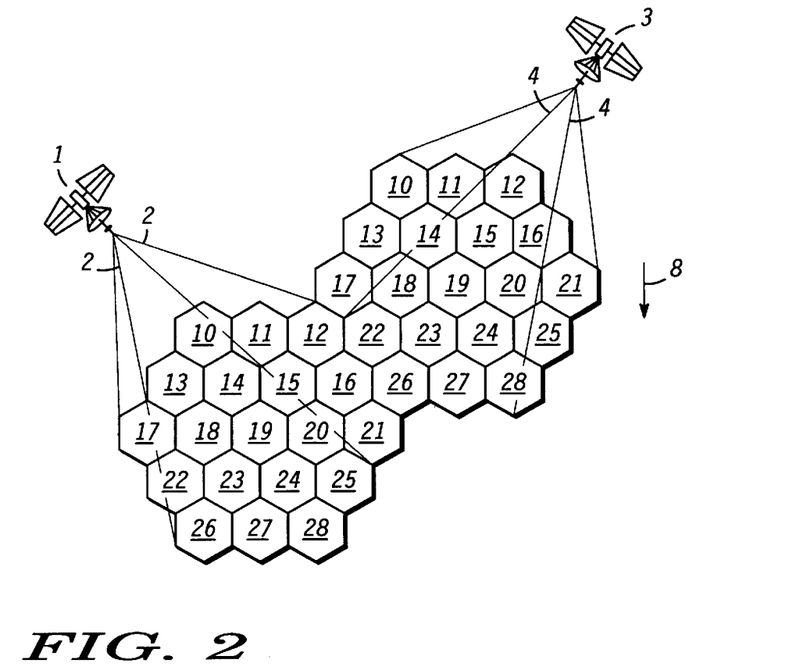
FIG. 2 shows a diagram of cellular patterns formed by adjacent satellites projecting communication beams upon the surface of the earth.

FIG. 2 shows a diagram of cellular patterns formed by adjacent satellites projecting communication beams upon the surface of the earth. Satellites 1 and 3 (which may be identical to satellite 1) employ frequency spectrum reuse techniques. These techniques comprise cellular partitioning of projection beamwidths. Satellites 1 and 3 generate beam set projections 2 and 4, respectively. Beam set projections 2 and 4 are bi-directional gain areas (cells) associated with antennas on satellites 1 and 3. These antennas may be individual directional antennas or a phased array antenna capable of multiple beam projection.

Cells 10–28 may assume many shapes depending on the gain characteristics of the antennas. In FIG. 2, cells 10–28 are shown as hexagons for illustrative purposes. Cells 10–28 advance in orbit direction 8 as satellites 1 and 3 orbit in direction 8. Cells 10–28 utilize partitioned non-interfering frequencies and time-slots for subscriber unit communications on subscriber links 112.

Frequency spectrum reuse in cellular systems complicates subscriber unit determination of allowable communication frequencies and control (broadcast and acquisition) channels within a specific cell. Subscriber unit control information typically comes from a broadcast control channel that subscriber units monitor. In the prior art, subscriber units scan a series of predetermined channels that are dedicated to the control function to determine applicable control channels either through power measurements or location data. Scanning control channels causes delay in acquisition of control information and dedicating a predetermined set of control channels inefficiently consumes resources.

In the present invention, a dedicated universal single frequency, ring alert channel 48 (FIG. 3), is used to sequentially broadcast a ring alert message 82 (FIG. 4) containing control information to successive cells 10–28 within beam set projections 2 and 4. Subscriber units 300 monitor a single frequency and receive information directing them to their cell specific broadcast (control) channels. This alleviates the need for subscriber units to scan many frequencies and time slots for an applicable control channel.

Figure 3:
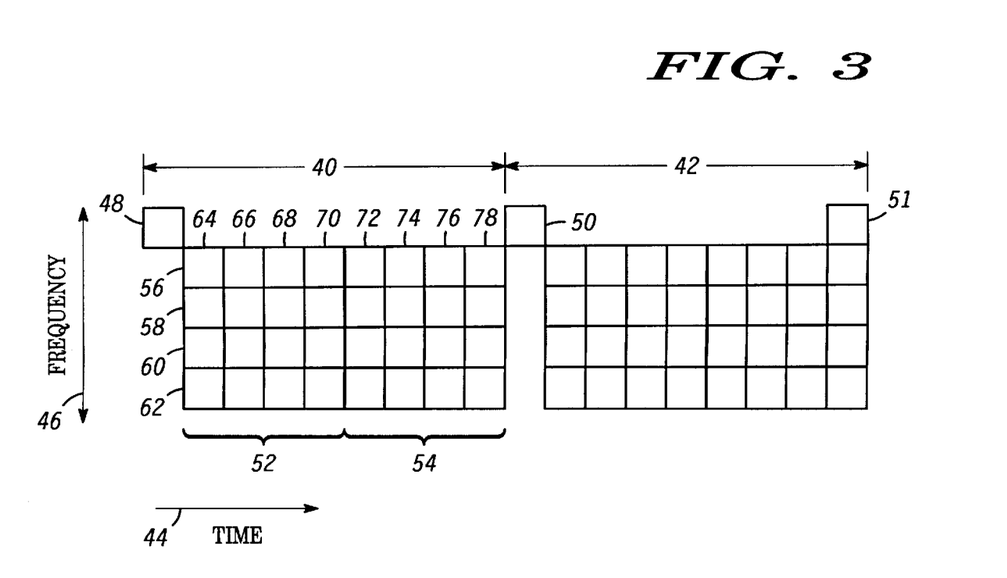
FIG. 3 shows a diagram of frequency and time partitioning of communications spectrum between subscriber units and satellites, in accordance with the present invention.

FIG. 3 shows a diagram of frequency 46 and time 44 partitioning of communications spectrum between subscriber units 300 and satellites 1 (FIG. 1), in accordance with the present invention. Communications between satellites 1 and subscriber units 300 occur over subscriber link 112 (FIG. 1).

Subscriber link 112 consists of a series of subscriber link frames 40 and 42 shown continuous along time axis 44. Careful assignment of transmit (downlink) and receive (uplink) portions of subscriber link 112 minimizes interference effects from adjacent satellites. The receive portion of subscriber link frame 40 comprises uplink time 52, downlink time 54 and ring alert channel 48.

Uplink time 52 contains time-segmented uplink time slots 64, 66, 68, and 70. For illustrative purposes, four uplink time slots are shown; however, in a Frequency Domain/Time Domain Multiple Access (FDMA/TDMA) system, any manageable number of time slots may be employed. Subscriber units 300 are assigned a specific time slot and a specific frequency 56, 58, 60 or 62 wherein they transmit information to satellites 1.

Downlink time 54 contains time segmented downlink time slots 72, 74, 76, and 78. For illustrative purposes, four downlink time slots are shown; however, in a FDMA/TDMA system, any manageable number of time slots may be employed. Subscriber units 300 are assigned a specific time slot wherein they receive information from satellites 1.

Subscriber link frame 42 shows an alternate embodiment of a ring alert channel wherein ring alert channel 51 is time-scheduled during a downlink time of a satellite transmission. Overlapping ring alert channel transmissions with downlink transmissions may place a simultaneous reception burden on a subscriber unit, however, simplifications to subscriber unit timing may result.

Satellite transmissions during downlink time 54 radiate generally into specific cells as shown in FIG. 2. However, an appreciable amount of transmissions from satellite 1 spread and continue propagating to satellite 3. These emissions may interfere with subscriber unit transmissions to satellite 3 in a subsequent frame or time slot. To alleviate this problem, a reception blackout period is defined, wherein received signals at satellites 1 are ignored.

Although a satellite receive blackout period reduces the impact of extraneous interference from adjacent satellites, it impacts system throughput. The present invention utilizes this receive blackout period as a satellite transmit window for transmitting information to subscriber units 300 on a non-downlink time frequency. Ring alert channel 48 utilizes these satellite receive blackout periods to transmit control information to successive cells 10–28 using a dedicated universal single frequency channel. This satellite receive blackout period may also be used for other simplex transmit functions such as paging provided that the frequency is not also used for duplex channels.

Having a ring alert channel that provides a directory to broadcast (control) channels for subscriber units allows the communication system to dynamically assign broadcast channels for more efficient use of spectrum; therefore, it is not necessary to dedicate a block of spectrum for use only as broadcast channels.

Figure 4:
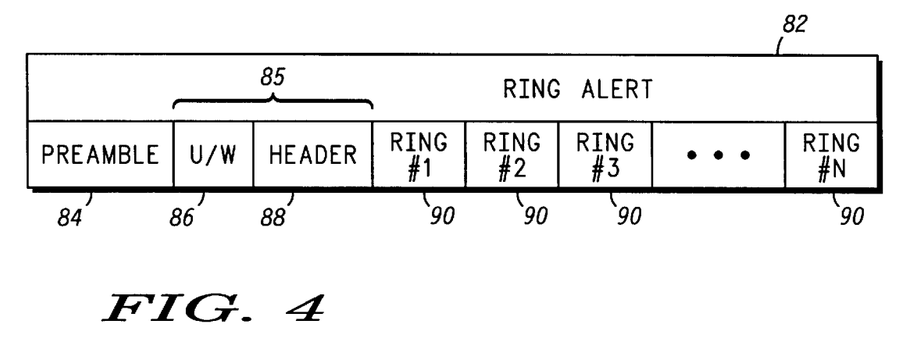
FIG. 4 shows a diagram of a ring alert message, in accordance with an embodiment of the invention.

FIG. 4 shows a diagram of a ring alert message 82, in accordance with an embodiment of the invention. System 116 (FIG. 1) requires a broadcast (control) channel to inform subscriber units 300 of incoming calls. In a preferred embodiment, ring alert message 82 comprises a preamble 84, a control information 85, and a list of subscriber unit IDs 90. Preamble 84 facilitates the acquisition of ring alert message 82 and in a preferred embodiment is a fixed period of unmodulated carrier frequency.

In a preferred embodiment, control information 85 comprises a unique word 86 and a header 88. Unique word 86 uniquely identifies a communications command between subscriber units 300 and satellites 1. Header 88 comprises satellite ID, cell ID, cell geographic location, next ring alert interval, and beam specific broadcast channel frequency and time slot information. Subscriber units 300 may use cell geographic location information rather than received power measurements for calculating a servicing cell.

Subscriber unit IDs 90 indicate a request for communication with a subscriber units located within a specific cell. When a subscriber unit detects a subscriber unit ID 90 matching its own, subscriber unit 300 notifies satellites 1 of its availability to receive the call.

As stated above, satellites 1 and 3 (FIG. 2) individually transmit a ring alert message 82 to cells 10–28 in sequential subscriber link frames 40. Since satellites 1 and 3 will only "ring" (send a subscriber unit ID) a subscriber unit in a specific cell, subscriber units 300 need only monitor ring alert channel 48 when satellites 1 or 3 transmit a ring alert message 82 into the cell encircling subscriber unit 300. Subscriber units 300 conserve power by transitioning to a low power "sleep" (standby) mode and "waking" only to monitor a ring alert channel 48 directed to the specific cell encircling subscriber unit 300.

Figure 5:
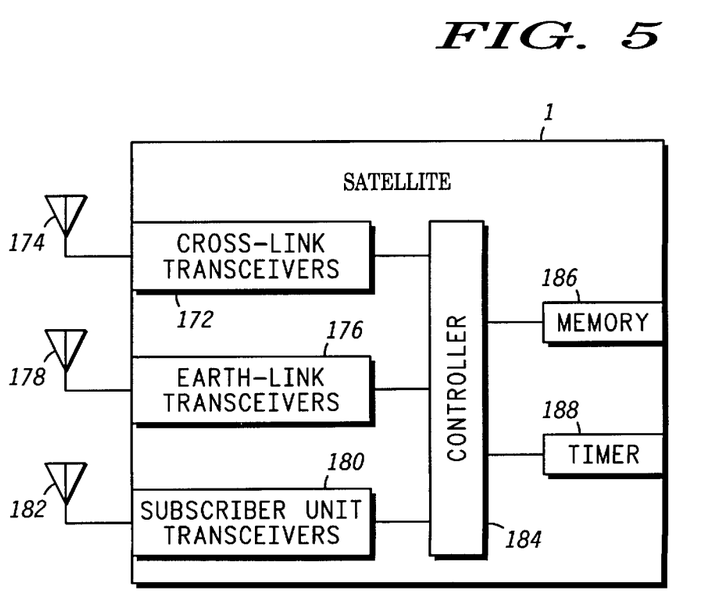
FIG. 5 shows a block diagram of a satellite of the communications system.

FIG. 5 shows a block diagram of a satellite of the communications system. Preferably, all satellites 1 within system 116 (see FIG. 1) are substantially described by the block diagram of FIG. 5. Satellite 1 includes cross-link transceivers 172 and cross-link antennas 174. Transceivers 172 and antennas 174 support cross-links to other nearby satellites 1. Gateway link transceivers 176 and gateway link antennas 178 support gateway links 119 to communicate with gateways 117 (FIG. 1). Moreover, subscriber unit transceivers 180 and subscriber unit link antennas 182 support subscriber units 300 (FIG. 1). Preferably, each satellite 1 may simultaneously support links for up to a thousand or more of subscriber units 300 (FIG. 1). Of course, those skilled in the art will appreciate that antennas 174, 178, and 182 may be implemented either as single multi-directional antennas or as banks of discrete antennas. It is desirable that subscriber unit antenna 182 be a phased array antenna capable of accessing many cells 10–28 (FIG. 2) simultaneously.

A controller 184 couples to each of transceivers 172, 176, and 180 as well as to a memory 186 and a timer 188. Controller 184 may be implemented using one or more processors. Controller 184 uses timer 188 to maintain the current date and time. Memory 186 stores data that serve as instructions to controller 184 and that, when executed by controller 184, cause satellite 1 to carry out procedures which are discussed below. In addition, memory 186 includes variables, tables, and databases that are manipulated due to the operation of satellite 1.

Subscriber unit transceivers 180 are desirably multi-channel FDMA/TDMA transceivers capable of transmitting and receiving on all different selectable frequencies during particular, selectable, time slots as directed by controller 184. Subscriber unit transceivers 180 have a sufficient number of channels to provide the desired number of transmission and reception frequencies for communications. Controller 184 may provide for allocation of the frequency and time-slot assignments, generation of ring alert messages and information contained therein. Subscriber unit transceivers 180 desirably provide for transmission and reception on any frequency channel set so that each subscriber unit transceiver 180 may, if needed, utilize the entire spectral capacity of all frequency channel sets by having the capability to handle all frequency and time slot assignments.

Figure 6:
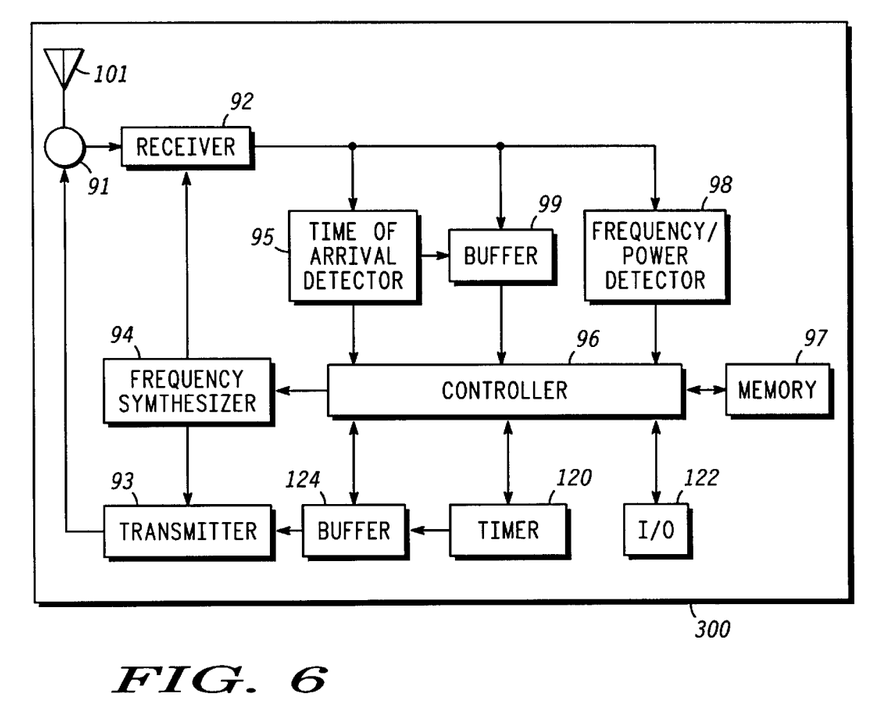
FIG. 6 shows a block diagram of a subscriber unit, in accordance with the present invention.

FIG. 6 shows a block diagram of a subscriber unit, in accordance with the present invention. Subscriber unit 300 includes a receiver 92. Receiver 92 receives signals from satellite 1. Receiver 92 couples to a receive buffer 99, which temporarily stores data received at receiver 92 until these data can be processed. Receiver 92 also couples to a time of arrival detector 95 and a frequency/power detector 98. These detectors aid in channel analysis and selection.

Time of arrival detector 95 identifies the point in time when a burst of baseband data are initially received at subscriber unit 300. Detector 95 couples to buffer 99 so that data may be correctly clocked into buffer 99 as they are received.

Frequency/power detector 98 measures a frequency associated with baseband data. Baseband data may be associated with a residual IF frequency due to Doppler and errors in precisely modulating and demodulating baseband data. Detector 98 also measures received power levels for monitoring ring alert channels in adjacent cells.

Buffer 99, time of arrival detector 95, and detector 98 all couple to a controller 96. Controller 96 also couples to a frequency synthesizer 94 to control receive and transmission frequencies. Synthesizer 94 provides a local oscillator signal to receiver 92.

Controller 96 additionally couples to a timer 120, a memory 97, and transmit buffer 124. Controller 96 uses timer 120 to track real time by maintaining the current date and time. In addition, timer 120 helps detect precise points in time for exiting a low-power sleep state to monitor ring alert channel 48 and for transmitting data from subscriber unit 300. Transmit buffer 124 temporarily stores data placed therein by controller 96. Transmit buffer 124 couples to transmitter 93, and synthesizer 94 provides a local oscillator signal which transmitter 93 uses in modulating baseband data to RF. Receiver 92 and transmitter 93 couple through a signal splitter 91 to antenna 101. Timer 120 couples to transmit buffer 124 to specify when data are to be clocked from buffer 124 for transmission through transmitter 93, signal splitter 91, and antenna 101.

Memory 97 includes data which serve as instructions to controller 96 and which, when executed by controller 96, cause subscriber unit 300 to carry out processes that are discussed below. In addition, memory 97 includes variables, tables, offsets, and databases that are manipulated due to the operation of subscriber unit 300.

In subscriber unit 300, controller 96 also couples to an I/O section 122. In subscriber unit 300, I/O section 122 may include microphones, speakers, digitizers, vocoders, decoders, and the like, to convert between audio and digitized packets that are compatible with system 116 (see FIG. 1).

Figure 7:
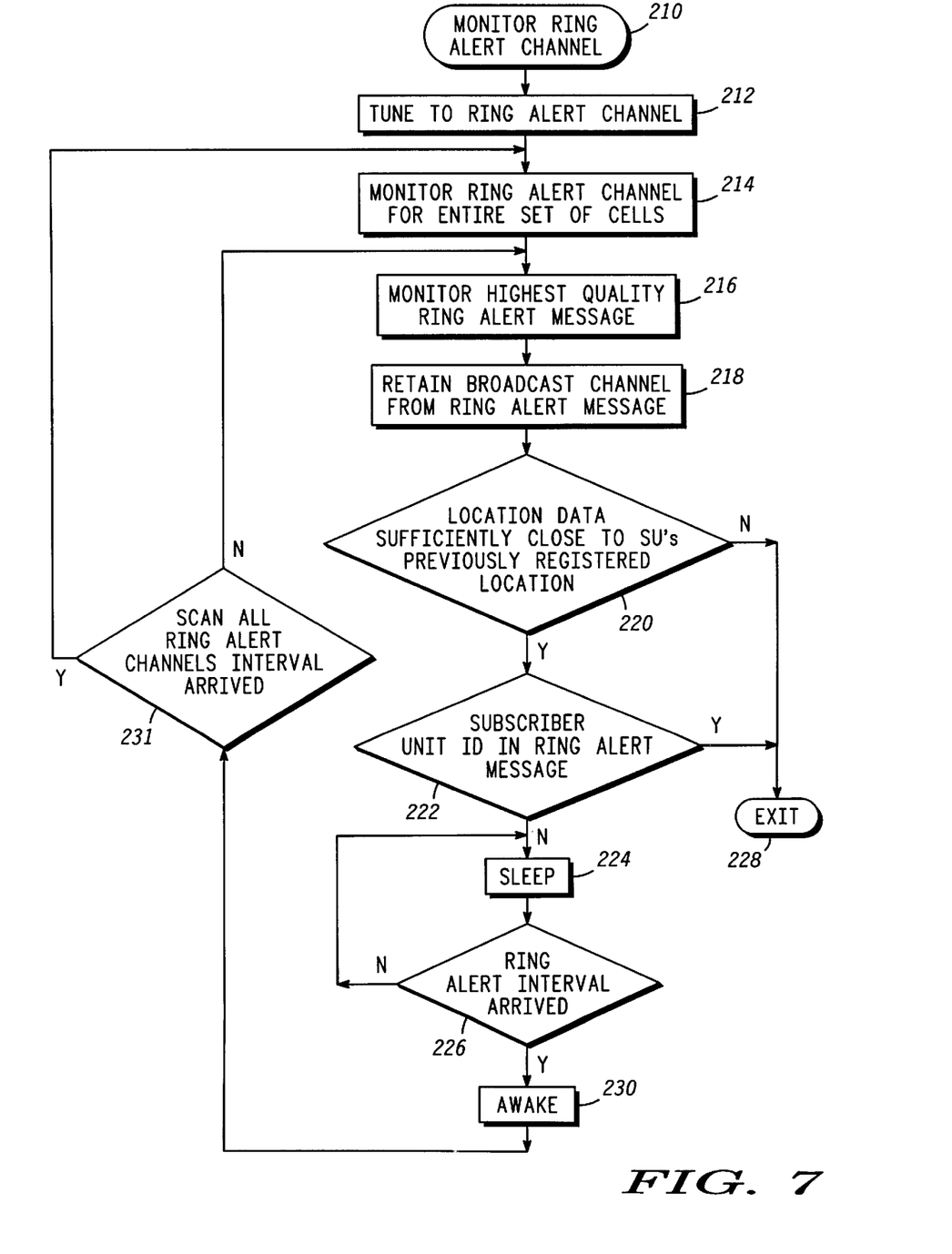
FIG. 7 shows a flowchart of an incoming call notification method for subscriber units, in accordance with a preferred embodiment of the invention.

FIG. 7 shows a flowchart of an incoming call notification method for subscriber units, in accordance with a preferred embodiment of the invention. This method notifies subscriber units of incoming calls and directs subscriber units to broadcast channels associated with the cell currently providing service to subscriber units contained therein.

When a subscriber unit initially powers up, it enters a low power standby mode. In this mode, it acquires and tracks the ring alert channel 48 (FIG. 3) until an event occurs to initiate transition to another mode of operation. Events that terminate standby mode operation include subscriber action to initiate a call, detection that registration is necessary, receipt of a subscriber unit's identification in the ring alert message for the subscriber unit and removal of power to subscriber unit.

Application of power to a subscriber unit initiates a monitor ring alert channel process 210. A task 212 is performed causing the subscriber unit to tune its receiver to a predetermined ring alert frequency. A task 214 monitors each of the ring alert channels (successive subscriber link frames 40, as illustrated in FIG. 3) in cells 10–28 (FIG. 2) that can be received from its location. This allows subscriber unit 300 to select the cell providing favorable communications conditions. It should be noted that some ring alert messages in adjacent cells may be undetectable by subscriber unit 300 because of the directional gain characteristics of antenna 182. The system cycles the ring alert channel through the satellite cells such that the entire Earth surface is covered periodically in a non-interfering manner.

The period between ring alert visits in a particular beam is approximately equal in frames to the number of cells formed by a single satellite. This period may, however, vary from time to time for interference avoidance as relative satellite positions change or to provide more ring alert opportunities in a high traffic area. Due to this variability, the exact interval unit the next ring alert visit in a particular cell is included in the control header of each ring alert signal sent in the cell.

In a task 216, subscriber unit 300 selects the best quality ring alert message for tracking. This signal quality measurement may be the received signal strength or the signal-to-noise ratio for each ring alert burst it receives. Channel selection may be based on received power, but this is susceptible to antenna side lobes and channel fading. In a preferred embodiment, a subscriber unit selects a cell nearest the subscriber unit's registered location. Subscriber unit 300 maintains a record of sequential signal monitoring to aid in this selection process.

A task 218 extracts the broadcast channel information contained in header 88 of ring alert message 82 (FIG. 4). This broadcast channel information directs subscriber unit 300 to a broadcast (control) channel.

In a task 220, subscriber unit 300 compares the received cell geographic location information contained in header 88 of ring alert message 82 with a previously reported (registered) location of subscriber unit 300. If the current received cell geographic location information is not sufficiently close to subscriber unit 300's previously registered location, the monitoring of the ring alert channel is exited in a task 228, and subscriber unit 300 commences registration with the system. Registration informs the communications system of the current location of a subscriber unit for efficient call routing.

If task 220 determines the received cell geographic location information to be sufficiently close to subscriber unit 300's previously registered location, then a task 222 is performed. In task 222, subscriber unit 300 compares each of the subscriber unit IDs 90 (FIG. 4) with its own stored ID. If a match is found, then monitor ring alert channel process 210 is exited via task 228.

If no match of IDs is detected, then subscriber unit 300 performs a sleep task 224. Sleep task 224 conserves subscriber unit power by idling unnecessary resources and allowing only critical elements such as timers to remain active.

In a task 226, subscriber unit 300 determines whether the next ring alert interval as received in control information 85 (FIG. 4) of ring alert message 82 is equal to the timer value. If these values equate, then subscriber unit 300 is awakened in a task 230.

In a task 231, subscriber unit 300 compares an interval timer to determine if it should continue monitoring a specific channel or monitor all ring alert channels to validate the ring alert channel currently being monitored, or to take note of any reassignment of ring alert channels with cells. If the interval to scan or receive all channels has not arrived, then subscriber unit returns operation to task 216 where it monitors its earlier selected ring alert channel.

Periodically, subscriber unit 300 re-enters an acquisition state where it monitors all of the ring alert channels it can detect or receive from its location. This allows a subscriber unit to select a new cell to monitor. The periodic selection of a new cell is required because satellites 1 move relative to a point on the Earth. This period is approximately the time it take a beam or cell to pass over a point on the Earth.

It will be appreciated that the present invention therefore provides an apparatus and method of ringing a called party in a communications system which is significantly more frequency spectrum efficient and more easily acquired than ring alert channels requiring multiple channels.

Additionally, the present invention provides an improved method of directing subscriber units to applicable control channels without requiring subscriber units to scan a suite of control channels.

Furthermore, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of informing a subscriber unit of an incoming call, said method comprising:
    monitoring a universal ring alert channel, wherein said universal ring alert channel provides a directory of ring alert channels, said universal ring alert channel being used by a satellite to direct said subscriber unit to cell specific ring alert channels, and at a predetermined sequence;
    monitoring, in a predetermined sequence, said cell specific ring alert channels;
    selecting one channel of said cell specific ring alert channels having a preferable signal quality;

monitoring said one channel for the presence of a ring alert message containing a subscriber unit ID;

extracting a next ring alert interval from said ring alert message;

setting a timer to expire upon arrival of said next ring alert interval;

sleeping in a low-power mode;

awaking upon expiration of said timer; and if said subscriber unit ID is detected, initiating an acquisition process by transitioning to a traffic channel, else returning to the monitoring in said predetermined sequence step.

2. A method as recited in claim 1, wherein the monitoring said universal ring alert channel further comprises the step of identifying a servicing cell.

3. A method of directing a subscriber unit to a ring alert channel in a satellite cellular communications system, said method comprising the steps of:

(a) reserving a universal ring alert channel having a universal frequency known by said subscriber unit, wherein said universal ring alert channel provides a directory of ring alert channels, said universal ring alert channel being used by a satellite to direct said subscriber unit to cell specific ring alert channels;

(b) transmitting, by a satellite, a channel frequency and time slot of said ring alert channel using one or more ring alert messages on said universal ring alert channel, said ring alert messages transmitted by said satellite at the universal frequency and in a predetermined sequence through multiple communication cells projected by said satellite, whereupon said subscriber unit can receive at least one ring alert channel within at least one of said multiple communication cells and select a ring alert channel having a preferable signal quality;

(c) receiving said channel frequency and time slot of said ring alert channel in said ring alert message on said universal ring alert channel; and (d) monitoring said ring alert channel.

4. A ring alert message in a satellite cellular communication system having multiple satellites which project multiple communication cells, said ring alert message for indicating to said subscriber unit the presence of an incoming call, said ring alert message comprising:

a preamble to facilitate the acquisition of said ring alert message; and a control information to convey operational data of said system, wherein said ring alert message is transmitted on a universal ring alert channel which each of said multiple satellites uses to transmit ring alert messages, and a satellite transmits said ring alert message in each of said multiple communication cells provided by said satellite in a sequential manner, said universal ring alert channel which provides a directory of ring alert channels being used by a satellite to direct said subscriber unit to cell specific ring alert channels, whereupon said subscriber unit can receive at least one ring alert message within at least one of said multiple communication cells and select a ring alert message having a preferable signal quality.

5. A ring alert message as recited in claim 4, wherein said control information has a unique word for distinguishing said ring alert message from other system messages and a header for identifying a particular satellite and cell, and a geographic location of said particular cell, said control information further comprising channel acquisition information.

6. A satellite cellular communications system employing a universal ring alert channel, wherein said universal ring alert channel provides a directory of ring alert channels, said universal ring alert channel being used by a satellite to direct a subscriber unit to cell specific ring alert channels which correspond to an area wherein a subscriber unit is located, said system comprising:

a subscriber unit for monitoring said universal ring alert channel having a universal frequency, said subscriber unit extracting said cell specific ring alert channels and tuning to said cell specific ring alert channel, said universal ring alert channel providing control information to said subscriber unit;

a gateway for assigning and coordinating said universal ring alert channel throughout said system; and a constellation of satellites for transmitting said location of said cell specific ring alert channels using said universal channel, wherein a satellite of said constellation transmits said location of said broadcast channel in a predetermined sequence through multiple communication cells projected by said satellite, whereupon said subscriber unit can receive at least one ring alert message within at least one of said multiple communication cells and select a ring alert message having a preferable signal quality.

* * * * *